US012681781B1

(12) United States Patent
Li et al.

(10) Patent No.: US 12,681,781 B1
(45) Date of Patent: Jul. 14, 2026

(54) DISTRIBUTED EVENT PROCESSING ARCHITECTURE

(71) Applicant: Blue Yonder Group, Inc., Scottsdale, AZ (US)

(72) Inventors: Haidong Li, Dallas, TX (US); Haiying Wang, Plano, TX (US); Xiaofeng Shen, Coppell, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 672 days.

(21) Appl. No.: 18/083,083

(22) Filed: Dec. 16, 2022

Related U.S. Application Data

(60) Provisional application No. 63/323,998, filed on Mar. 25, 2022, provisional application No. 63/324,000, filed on Mar. 25, 2022.

(51) Int. Cl.
*G06F 9/54* (2006.01)
*G06F 16/21* (2019.01)
*G06F 16/23* (2019.01)

(52) U.S. Cl.
CPC .............. *G06F 9/542* (2013.01); *G06F 9/547* (2013.01); *G06F 16/213* (2019.01); *G06F 16/2358* (2019.01)

(58) Field of Classification Search
CPC ...... F06F 9/542; G06F 16/213; G06F 16/258; G06F 9/547
See application file for complete search history.

(56) References Cited

U.S. PATENT DOCUMENTS

| | | | |
|---|---|---|---|
| 6,321,236 B1* | 11/2001 | Zollinger | G06F 16/273 |
| | | | 707/999.203 |
| 11,243,979 B1* | 2/2022 | Mishra | G06F 16/273 |
| 2018/0167275 A1* | 6/2018 | Kovacheva | H04L 41/40 |
| 2020/0117680 A1* | 4/2020 | Bapat | G06F 9/546 |
| 2020/0250203 A1* | 8/2020 | Calco | G06F 16/27 |
| 2022/0334834 A1* | 10/2022 | Chartrand | G06F 8/35 |
| 2023/0109215 A1* | 4/2023 | Petrov | G06F 16/2282 |
| | | | 717/121 |
| 2024/0378028 A1* | 11/2024 | Chartrand | G06F 8/36 |

* cited by examiner

*Primary Examiner* — Chat C Do
(74) *Attorney, Agent, or Firm* — Spencer Fane LLP; Steven J. Laureanti

(57) ABSTRACT

A system and method are disclosed for propagating changes to a schema model. Embodiments include detecting a change to a system represented by the schema model, generating a change event based on the change to the schema model, determining microservice actors that execute within a container-based computation service, where the microservice actors are configured to be triggered by the change event, dispatching the change event to the microservice actors, and updating, by the microservice actors, the schema model. The system further comprises setting up and controlling one or more virtual machines to execute the microservice actors. The behavior of each of the microservice actors is specified by a configuration file, which is associated with a particular microservice actor and specifies the name of a particular microservice actor, what objects a microservice actor may update, actions a microservice actor may take and change events that trigger a microservice actor.

14 Claims, 8 Drawing Sheets

700

```
{
    "authContext" : {
    "currentTid" : "b62e6k59",
    "currentUser" : "b62e6k59-bf0cb4c823ee42d4",
    "currentRoles" : [
       "INTEGRATOR"
    ]
    },
   "body": {
    "auditTrails": [
710       {
          "tid" : "xyz",
712       "dataType" : "Shipment",
          "topic" : null,
714       objectId : "xyz-Shipment-cdaef77f76eca8e8adc5f18d8ee647b1",
716       "changeDate" : 1571529613492,
718       "changes" : [
             {
                "type" : "UPDATE",
                "fieldName" : "predicatedDeliveryDate",
                "oldValue" : 1571523341445,
                "newValue" : 1571529613490
             },
             {
                "type" : "UPDATE",
                "fieldName" : "currentLocationLatitude",
                "oldValue" : 13.37409,
                "newValue" : 13.15893
             },
             {
                "type" : "UPDATE",
                "fieldName" : "currentLocationLongitude",
                "oldValue" : -59.42199,
                "newValue" : -59.00633
             }
          ]
       }
    ],
    "sourceEvent" : null,
    "targetEvent" : "Shipment-change"
    }
}
```

```
shipments:
810 ── processType: demand
812 ── shipmentType: outboundShipment -> business entity
  814 ── name: outboundShipmentToDeliveriesFormula
  816 ── actorName: formulaActor
  818 ── params: -> parameters, easily adapted for different business scenarios
        - name: formulaName
        value: shipmentToDeliveriesFormula
        - name: noActionDeliveryStates
        value: Cancelled
        - name: stateOperationMapping
        value: Planned Shipment: Save
        - name: updateFields
        value: line.predictedDeliveryDate: predictedDeliveryDate
      triggeredBy:
820 ── fields: [predictedDeliveryDate] -> only dispatched if predictedDeliveryDate is changed
822 ── schedulues:
        - cronPatterm: "0 0 0 ? * MOM*" -> actor can also run itself based on schedule
```

FIG. 8

DISTRIBUTED EVENT PROCESSING ARCHITECTURE

CROSS-REFERENCE TO RELATED APPLICATIONS

The present disclosure is related to that disclosed in the U.S. Provisional Application No. 63/323,998, filed Mar. 25, 2022, entitled "Distributed Event Processing Architecture" and U.S. Provisional Application No. 63/324,000, filed Mar. 25, 2022, entitled "Distributed Event Processing for Supply Chain." U.S. Provisional Application Nos. 63/323,998 and 63/324,000 are assigned to the assignee of the present application. The present invention hereby claims priority under 35 U.S.C. § 119 (e) to U.S. Provisional Application Nos. 63/323,998 and 63/324,000.

TECHNICAL FIELD

The present disclosure relates generally to distributed processing architecture and specifically using change-based events to trigger propagation of changes using distributed processing architecture.

BACKGROUND

When performing modeling of a complex interrelated system, one challenge is forwarding, or propagating, changes from one element of the system to other elements. When elements of a complex system are interconnected, a change made to one element may need to be analyzed to determine the impact of the change, including necessary changes to other elements of the system, what one may call a "ripple effect" in the system. Such ripple effects may affect dozens if not hundreds of elements of the complex system depending on interrelatedness and scale. Depending on the type of complex system, the impact analysis and propagation are highly dependent on various factors, such as a business type if the complex system is a business schema. Traditional change propagation systems are hard to develop, difficult to adapt to different modeling requirements and may not easily scale to compensate for times of increased processing need.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates an example change event, according to an embodiment; and

FIG. 8 illustrates an example configuration of a microservice actor, according to an embodiment.

DETAILED DESCRIPTION

Figure 1:
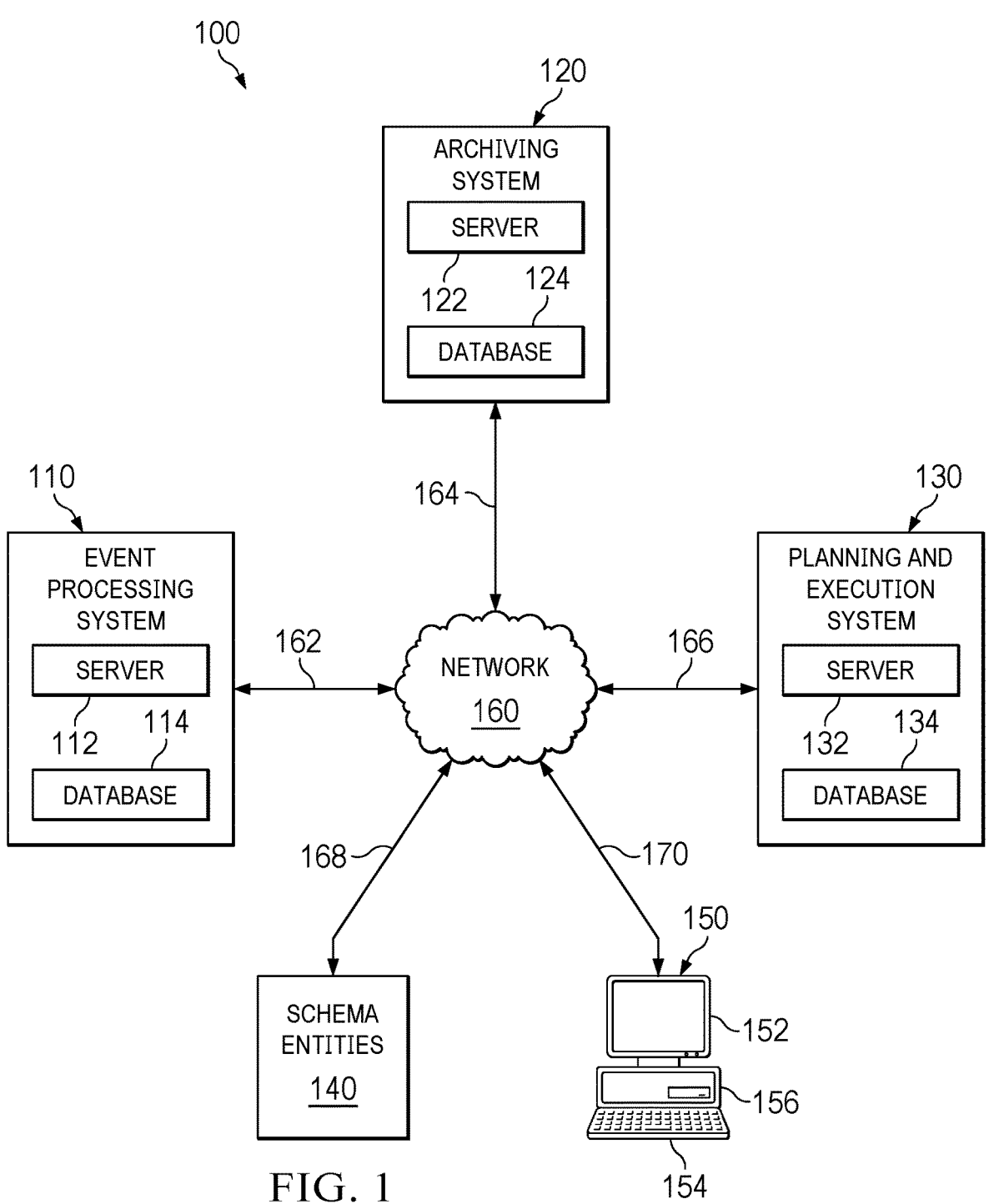
FIG. 1 illustrates a schema modeling system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments of the following disclosure provide a system and method to model changes made to a complex system modeled as a schema. Changes to the complex system are propagated throughout the schema using a distributed, microservice-based architecture. The schema is modeled using a common object design pattern which allow for tracking any changes made to the common objects. When a change is detected, the system generates a change event representing the detected change. Then, an event bus finds microservices associated with actors which have been configured to be triggered by changes in the schema. As used herein, the phrase "microservice actors" means actors corresponding to the microservices. Microservice actors are independent of one another, and are capable of updating common objects within the schema. After finding the matching microservices, the event bus dispatches the change event to the microservices, which in turn dispatch the change event to the corresponding actors. The actors then, depending on the type of change event, may update additional objects within the schema, thus triggering additional actors, or may perform various other actions, such as, for example, sending an email or other message or a user of schema modeling software.

Embodiments of the following disclosure significantly simplify the change propagation process for complex system modeling by making a set of microservice actors each responsible for a single aspect of the schema representing the complex system. Embodiments are also significantly more scalable than existing complex system models that include change propagation, as additional microservices can be added to compensate for additional processing needed during instances of increased need. Further, embodiments allow for the configuration of actors to be dynamically updated at runtime, in order to account for changing conditions within the complex system without needing to stop the processing of the schema modeling software.

FIG. 1 illustrates schema modeling system 100, in accordance with a first embodiment. Schema modeling system 100 comprises event processing system 110, archiving system 120, planning and execution system 130, one or more supply schema entities 140, computer 150, network 160, and communication links 162-170. Although a single event processing system 110, a single archiving system 120, a single planning and execution system 130, one or more schema entities 140, a single computer 150, a single network 160 and communication links 162-170 are shown and described, embodiments contemplate any number of event processing systems 110, archiving systems 120, planning and execution systems 130, schema entities 140, computers 150, networks 160, or communication links 162-170 according to particular needs.

In one embodiment, the event processing system 110 comprises server 112 and database 114. Server 112 comprises one or more modules that model a complex system. Server 112 also comprises one or more modules, such as an event generator, an event bus and a computation service, to operate a microservice-based distributed processing architecture in order to propagate changes to a schema model based on changes made to the complex system. Database 114 comprises data corresponding to these activities, including data of the schema model.

Archiving system 120 of schema modeling system 100 comprises server 122 and database 124. Although archiving system 120 is shown as comprising a single server 122 and a single database 144, embodiments contemplate any suitable number of servers 122 or databases 124 internal to or externally coupled with archiving system 120. Server 122 may support one or more processes for receiving and storing data from planning and execution system 130, one or more schema entities 140, and/or one or more computers 150 of schema modeling system 100, as described in more detail herein. Server 122 may store the received data in database 124. Database 124 may comprise one or more databases or other data storage arrangements at one or more locations, local to, or remote from, server 122.

According to an embodiment, planning and execution system 130 comprises server 132 and database 134. Server 132 comprises one or more modules, such as, for example, a modeler, and/or an engine, for performing actions of one or more planning and execution processes. Server 132 store and retrieves data from database 134 or from one or more locations in schema modeling system 100. In addition, planning and execution system 130 operates on one or more computers 150 that are integral to or separate from the hardware and/or software that support archiving system 120, and one or more schema entities 140.

One or more schema entities 140 may include, for example, one or more entities of the complex system modeled by the schema. For example, if the complex system is a business, schema entities 140 may include business units, properties owned, tangible assets, intangible assets, employees or other business characteristics. As another example, if the complex system is a manufacturing enterprise, schema entities 140 may include raw materials, finished goods, equipment, robotic machinery, employees, raw material deliveries, finished goods shipments or other manufacturing characteristics. Although one example of a schema modeling system is shown and described, embodiments contemplate any configuration of schema modeling system 100, without departing from the scope described herein.

As shown in FIG. 1, schema modeling system 100 comprising the event processing system 110 system, archiving system 120, planning and execution system 130, and one or more schema entities 140 may operate on one or more computers 150 that are integral to or separate from the hardware and/or software that support the event processing system 110, archiving system 120, planning and execution system 130, and one or more schema entities 140. One or more computers 150 may include any suitable input device 154, such as a keypad, mouse, touch screen, microphone, or other device to input information. Output device 154 may convey information associated with the operation of schema modeling system 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to schema modeling system 100.

One or more computers may include one or more processors 156 and associated memory to execute instructions and manipulate information according to the operation of schema modeling system 100 and any of the methods described herein. In addition, or as an alternative, embodiments contemplate executing the instructions on one or more computers that cause one or more computers to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, schema modeling system 100 may comprise a cloud-based computing system, including but not limited to serverless cloud computing, having processing and storage devices at one or more locations, local to, or remote from the event processing system 110, archiving system 120, planning and execution system 130, and one or more schema entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the event processing system 110 and archiving system 120. These one or more users may include, for example, an "administrator" handling machine learning model training, administration of cloud computing systems, and/or one or more related tasks within schema modeling system 100. In the same or another embodiment, one or more users may be associated with planning and execution system 130 and one or more schema entities 140.

In one embodiment, the event processing system 110, archiving system, planning and execution system 130, schema entities 140, and computer 150 may be coupled with network 160 using one or more communication links 162-170, which may be any wireline, wireless, or other link suitable to support data communications between the event processing system 110, archiving system 120, planning and execution systems 130, schema entities 140, computer 150, and network 160 during operation of schema modeling system 100. Although communication links 162-170 are shown as generally coupling the event processing system 110, archiving system 120, planning and execution system 130, one or more schema entities 140, and computer 150 to network 160, any of the event processing system 110, archiving system 120, planning and execution system 130, one or more schema entities 140, and computer 150 may communicate directly with each other, according to particular needs.

In another embodiment, network 160 includes the Internet and any appropriate local area networks (LANs), metropolitan area networks (MANs), or wide area networks (WANs) coupling the event processing system 110, archiving system 120, planning and execution system 130, one or more schema entities 140, and computer 150. For example, data may be maintained locally to, or externally of, the event processing system 110, archiving system 120, planning and execution system 130, one or more schema entities 140, and one or more computers 150 and made available to one or more associated users of the event processing system 110, archiving system 120, planning and execution system 130, one or more schema entities 140, and one or more computers 150 using network 160 or in any other appropriate manner. For example, data may be maintained in a cloud database at one or more locations external to the event processing system 110, archiving system 120, planning and execution system 130, one or more schema entities 140, and one or more computers 150 and made available to one or more associated users of the event processing system 110, archiving system 120, planning and execution system 130, one or more schema entities 140, and one or more computers 150 using the cloud or in any other appropriate manner. Those skilled in the art will recognize that the complete structure and operation of network 160 and other components within schema modeling system 100 are not depicted or described. Embodiments may be employed in conjunction with known communications networks and other components.

Figure 2:
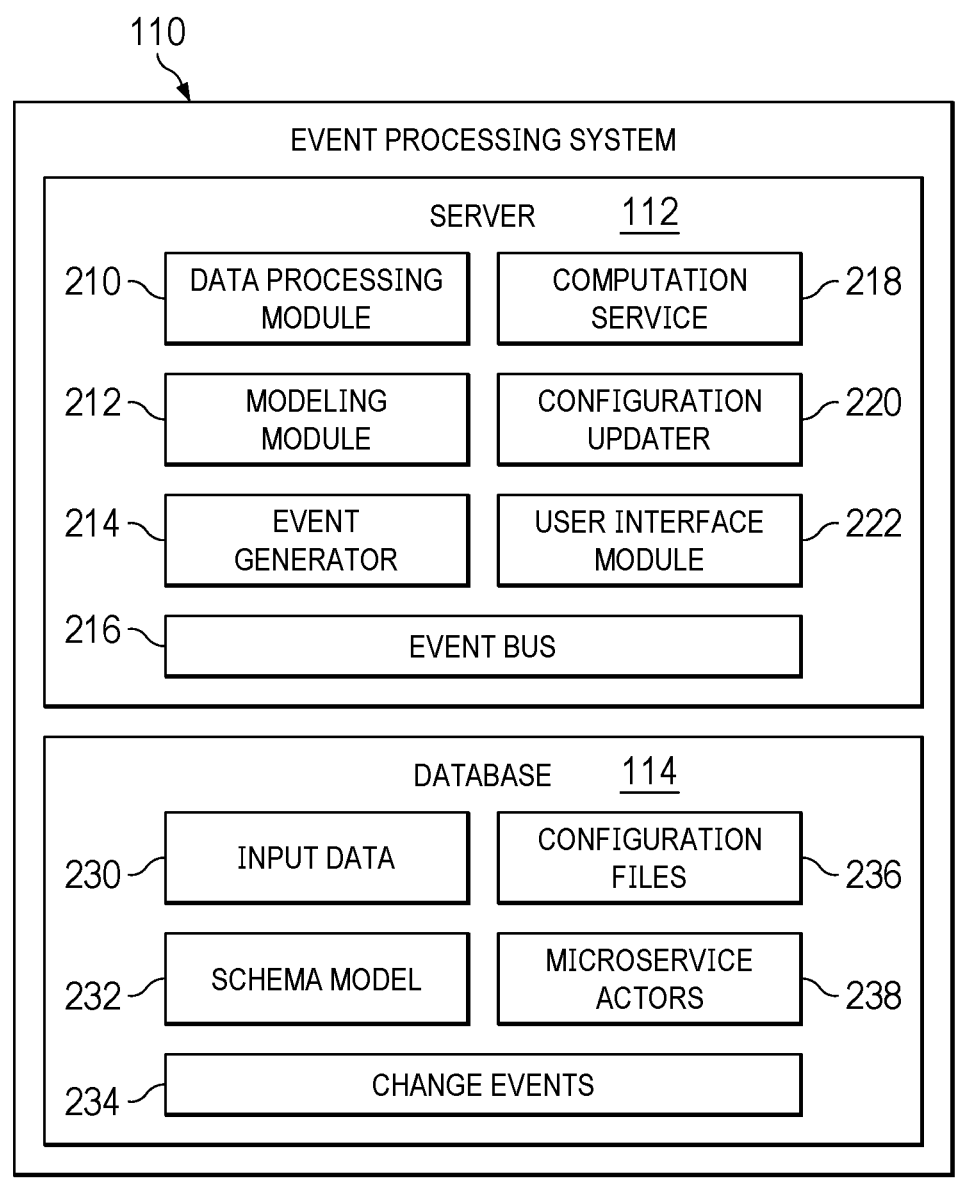
FIG. 2 illustrates the event processing system of FIG. 1 in greater detail, according to an embodiment.

FIG. 2 illustrates the event processing system 110 of FIG. 1 in greater detail, in accordance with an embodiment. As described above, the event processing system 110 comprises server 112 and database 114. Although event processing system 110 is shown as comprising a single server 112 and a single database 114, embodiments contemplate any suitable number of servers 112 or databases 114 internal to or externally coupled with the event processing system 110.

Server 112 may comprise data processing module 210, modeling module 212, event generator 214, event bus 216, computation service 218, configuration updater 220 and user interface module 222. Although server 112 is shown and described as comprising a single data processing module 210, a single modeling module 212, a single event generator 214, a single event bus 216, a single computation service 218, a single configuration updater 220, and a single user interface module 222, embodiments contemplate any suitable number or combination of these located at one or more locations, local to, or remote from event processing system 110, such as on multiple servers or computers at any location in schema modeling system 100.

According to embodiments, data processing module 210 receives data from archiving system 120, planning and execution system 130, one or more schema entities 140, one or more computers 150, or one or more data storage locations local to, or remote from, schema modeling network 100 and event processing system 110, and prepares the data for use in modeling the complex system. Data processing module 210 prepares received data by checking received data for errors and transforming the received data. Data processing module 210 may check received data for errors in the range, sign, and/or value and use statistical analysis to check the quality or the correctness of the data. Data processing module 210 may also normalize data, drop or delete null values, corrupted values, or blank values, and/or may otherwise prepare the data for use in the event processing system 110. According to embodiments, data processing module 210 transforms the received data to normalize, aggregate, and/or rescale the data to allow direct comparison of received data from the different planning and execution systems.

According to an embodiment, modeling module 212 identifies resources, attributes, assets, persons, properties, or any other possible schema characteristics, and generates a model of the complex system, saved as a schema model. Modeling module 212 generates connections between different entities within the schema model, such as entities that rely on other entities or change other entities. In one embodiment, modeling module 212 maps optional resources and material as primary and alternate connections.

According to an embodiment, event generator 214 detects a change in the schema, such as based on input from a user of the event processing system 110 or by entities of the schema equipped with data transmission capabilities, and generates a change event based on the change. A change in the schema may be, for example, an updated replacement value for a particular asset or an updated salary level for a particular employee. Upon generating a change event, event generator 214 sends the change event to event bus 216.

According to an embodiment, event bus 216 is a software bus operating on a distributed event grid. Event bus 216 is a scalable distributed event processing bus. Event bus 216 determines, based on a change event, which microservices correspond to that change event, and thereafter dispatches the change event to the corresponding microservices. The microservices thereafter determine which actors to distribute change events 234 to. Because microservice actors 238 themselves can further update the schema model and create additional change events, event bus 216 also receives those change events and determines what additional microservices are trigged by the additional change events. In order to prevent loops in event propagation, the microservices utilize directed acyclic graphs when dispatching change events to actors, so that no change event will be infinitely called.

According to an embodiment, computation service 218 is a distributed computation service executing various microservice actors independently of one another. Computation service 218 may execute the microservice actors in containers in order to ensure independence of the microservice actors, or in other embodiments may employ a cloud computing system to distribute the microservices. In general computation service 218 manages the allocation of processing, memory and storage resources to the microservice actors. In embodiments, computation service 218 may make schema models 232 available to microservice actors 238 in order to allow microservice actors 238 to perform updates to schema models 232, which in turn may generate additional change events.

According to an embodiment, configuration updater 220 updates configuration files 236 for microservice actors 238. In embodiments, configuration updater 220 may update configuration files 236 based on input from a user of the schema database, such as via input received from a graphical user interface (GUI). Configuration updater 220 may update configuration files 236 dynamically or at runtime of microservice actors 238. Configuration updater 220 allows the microservice actor behavior to be changed in response to changing business conditions or real-world conditions.

According to an embodiment, user interface module 222 generates and displays a user interface (UI), such as, for example, a graphical user interface (GUI), that displays one or more interactive visualizations of the schema model and/or change propagation within the schema model. According to embodiments, user interface module 222 may display interactive graphical elements provided for viewing the schema model. Further, user interface module 222 may display interactive graphical elements for updating data fields of schema entities, such as if a user of the event processing system 110 is aware of a change to a schema entity that has not yet been recorded in the schema model.

Database 114 may comprise one or more databases or other data storage arrangement at one or more locations, local to, or remote from, server 112. Database 114 comprises, for example, input data 230, schema models 232, change events 234, configuration files 236, and microservice actors 238. Although database 114 is shown and described as comprising input data 230, schema models 232, change events 234, configuration files 236, and microservice actors 238, embodiments contemplate any suitable number or combination of these, located at one or more locations, local to, or remote from, event processing system 110 according to particular needs.

As an example only and not by way of limitation, database 114 stores input data 230. Input data 230 may comprise, for example, various decision variables, business constraints, goals, and objectives of the one or more schema entities. According to some embodiments, input data 230 may comprise hierarchical objectives specified by, for example, business rules, master planning requirements, scheduling constraints, and discrete constraints, including, for example, sequence dependent setup times, storage, and the like.

According to an embodiment, schema models 232 may comprise characteristics of a complex system such as a business or manufacturing enterprise. Schema models 232 may be high level and represent broad section of the complex system. For example, if the complex system modeled is a business, the schema model may include business groups representing business activities such as marketing, sales or executive leadership and the relationships between those groups. Additionally, or in the alternative, schema models 232 may comprise characteristics that specify the schema structure in even more detail, including, for example, specifying particular employees belonging to a particular business group or particular assets used by a particular business group.

According to an embodiment, change events 234 are, as discussed above, generated by event generator 214 in response to a change within schema modeling system 100. A particular change event 234 identifies an object of a particular schema model 232 that has been updated, as well as the data that has been updated, the data that is being replaced, and the time that the update occurred. Change events 234 correspond to a particular object of the schema model, but may include one or more data updates for that object. For example, an object representing a business asset maybe be updated with both an updated sale value and an updated replacement value.

According to an embodiment, configuration files 236 are files specifying the behavior of microservice actors 238. Configuration files 236, as discussed above, may be updated dynamically. Configuration files 236 specify the microservice actor 238 they are associated with, the name of the microservice actor 238, parameters associated with the microservice actor 238, a specification of what objects the microservice actor 238 may update or what other actions the microservice actor 238 may take, as well as what change events 234 will trigger the microservice actor 238 to action.

Microservice actors 238 are microservice processes operated by computation service 218 which execute updates to schema models 232 based on change events 234. Microservice actors 238 operate according to configuration files 236. Microservice actors 238 are trigged by a particular change event 234. For example, a particular microservice actor 238 may be trigged by a change to the sale value data field of an asset object, meaning any change event 234 specifying the asset object and a change to the sale value data field will be dispatched to the particular microservice actor 238 by event bus 216. Microservice actors 238 execute independently of one another, meaning a processing failure of one microservice actor 238 will not alter the performance of other microservice actors 238. The independence of microservice actors 238 also allows for scalability of event processing system 110, by dynamically allowing for the addition or removal of microservice actors 238.

Figure 3:
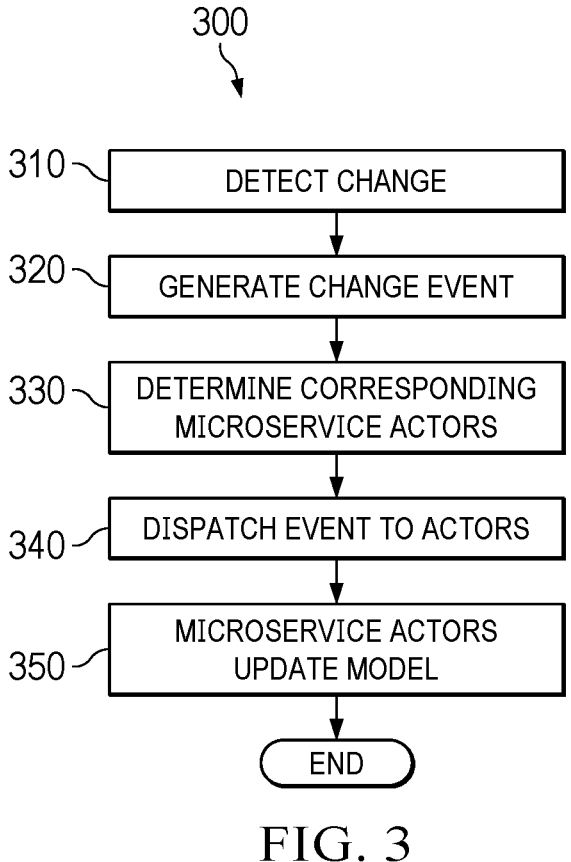
FIG. 3 illustrates an exemplary method for propagating changes to a schema model, according to an embodiment.

FIG. 3 illustrates exemplary method 300 for propagating changes to a schema model, according to an embodiment. Method 300 proceeds by one or more actions 310-350, which although described in a particular order, may be performed in one or more permutations, according to particular needs.

At first action 310, the event processing system 110 detects a change to the complex system represented by a schema model 232. The change may be based on input received from a user of the event processing system 110. For example, if the user of the event processing system 110 learns that a particular asset has broken down and become unusable, the user may input an updated status for the particular asset, which will be detected as a change by the event processing system 110.

At second action 320, the event processing system 110 generates change event 234 based on the detected change. Change event 234 is associated with a particular object, or entity, of schema model 232, such as a particular asset or a particular employee, and also includes what data of the object has been updated. For an asset, this may include a functionality status and repair cost, while for an employee, this may include a work location and an estimated productivity level, among other characteristics.

At third action 330, event processing system 110 determines a set of microservice actors 238 that correspond to change event 234, meaning event processing system 110 identities what microservice actors 238 are trigged by the combination of schema model 232 object and data field included in change event 234. Some change events 234 may trigger only a single microservice actor 238, such as a change event 234 for a single employee, while other change events 234 may trigger a large number of microservice actors 238, such as a change event 232 for an entire business group.

At fourth action 340, event processing system 110 dispatches change event 234 to the corresponding microservice actors 238. The dispatching may be performed by a software event bus. Event bus 216 can process many dispatches in parallel, efficiently batching the dispatching requests. Event bus 216 is aware of the total number of change events 234 active in event processing system 110, which can be used to provide an estimate of the current processing load required to process the remaining change events 234. This allows event bus 216 to scale up the number of microservice actors 238 if, for example, the current number of microservices will lead to extended processing times for the remaining change events 234, or to scale down the number of microservice actors 238 if relatively few change events 234 remain.

At fifth action 350, microservice actors 238 update schema model 234. Because microservice actors 238 operate independently of one another, updates to schema model 234 may occur in parallel, with different objects or nodes of schema model 232 being updated more or less simultaneously. Further, because these updates to schema model 232 can generate additional change events 234 by event processing system 110, a single upstream change to schema model 232 can be effectively propagated to all downstream objects. For example, if a particular asset's functionally status is updated, this may lead to updates in the projected productivity rates for one or more employees, which may lead to updates for predicted total output for a business group, which may lead to updates for predicted total revenue in a particular time period.

Figure 4:
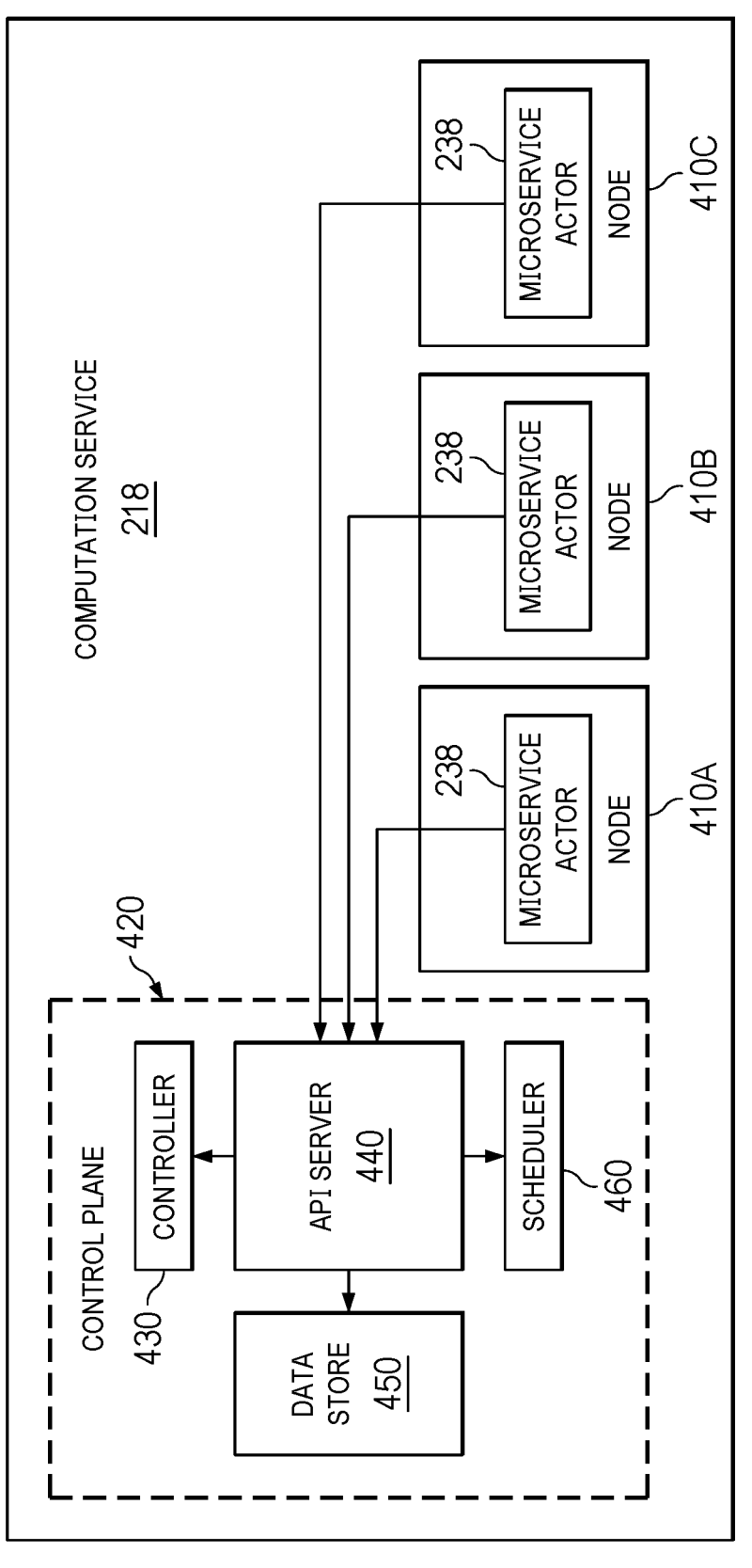
FIG. 4 illustrates the computation service of FIG. 2 in greater detail.

FIG. 4 illustrates computation service 218 of FIG. 2 in greater detail. Computation service 218 operates to perform computing tasks across one or more nodes 410, here shown as three nodes 410A, 410B and 410C. Other configurations of the elements of computation service 218 may be possible without altering the functions of computation service 218. Computation service 218 comprises controller 430, API server 440, data store 450, and scheduler 460, collectively called control plane 420, and one or more nodes 410. Control plane 420 and one or more nodes 410 are shown together, but in other embodiments, control plane 420 and one or more nodes 410 may execute on separate computing devices located separately or together with one another. In embodiments control plane 420 and one or more nodes 410 may execute across one or more cloud computing systems or within virtual machines or containers of a single computing system.

Controller 430 of control plane 420 determines processing and storage resources that should be made available to one or more nodes 410 and allocates the processing and storage resources accordingly. The amount of the processing and storage resources allocated may be based on one or more policies of computation service 218, such as evenly distributed the processing and storage resources, or allocating additional processing and storage resources to one or more nodes 410 executing higher priority tasks. Controller 430 is also responsible for monitoring the status of one or more nodes 410, such as checking for a failure of one or more nodes 410. Additionally, to accommodate new tasks assigned to computation service 218, controller 430 may add nodes to one or more nodes 410, and use scheduler 460 to assign a new microservice actor 238 to an added node.

API server 440 of control plane 420 provides an API for one or more nodes 410 to communicate with control plane 420, and communicates to one or more nodes 410 instructions on the amount of the processing and storage resources allocated to each node. Data store 450 of control plane 420 is a shared database containing data that may be accessible to each of one or more nodes 410, such as a schema model. Controller 430 may set permissions on which of one or more nodes 410 are able to view and/or alter the data of data store 450, and may restrict some or all of data store 450 to be view only to one or more of one or more nodes 410, or may prevent the viewing of some or all of data store 450 in other cases.

Scheduler 460 of control plane 420 generates new microservice actors 238 of computation service 218 and assigns these microservice actors 238 to one or more nodes 410. When considering such decisions, scheduler 460 may take into account individual and collective resource requirements of microservice actors 238 or one or more nodes 410 and hardware constraints. In embodiments, scheduler 460 may assign only one microservice actor 238 to each node 110 to ensure maximum independence of microservice actors 238. In embodiments, scheduler 460 may assign microservice actors 238 to nodes 410 having an excess of processing and storage resources, or may assign microservice actors 238 based on similarity of tasks performed by other microservice actors 238 on one or more nodes 410.

One or more nodes 410 are one or more virtual machines or containers set up and controlled by control plane 420 to execute one or more microservice actors 238. Control plane 420 determines when to add nodes 410 to accommodate additional microservice actors 238, or when to remove nodes 410 to account for decreased microservice actors 238 needed. In times of increased processing need control plane 420 may add many additional nodes 410 in order to scale performance.

Figure 5:
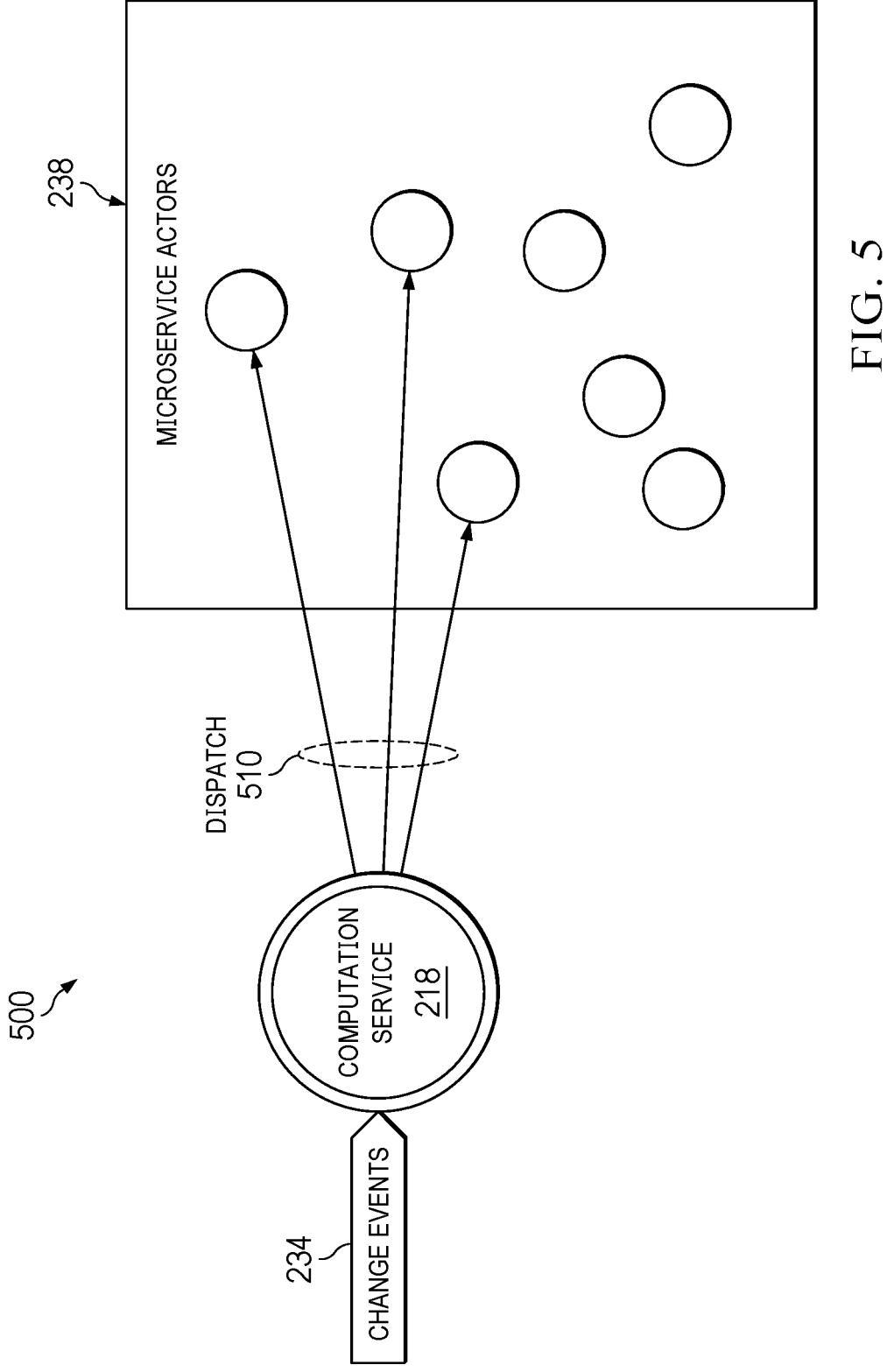
FIG. 5 illustrates an example method for dispatching change events, according to an embodiment.

FIG. 5 illustrates example method 500 for dispatching change events, according to an embodiment. As shown, change events 234 may be received by computation service 218, which dispatches change events 234 to a set of corresponding microservice actors 238. There may be a large set of microservice actors 238 within the plane of computation service 218. However, as illustrated, a particular change event 234 may only be dispatched to a subset of the available microservice actors 238. In this case, change event 234 being processed has been matched to three microservice actors 238 of the set of seven microservice actors 238, and consequently computation service 218 dispatches the change event to the corresponding actors.

Computation service 218 can auto scale. Microservice actors 238 are all segregated allowing computation service 218 to control costs by adding or dropping microservice actors 238 from its plane. Computation service 218 can also detect how many change events 234 are in event processing system 110, which is an accurate way of determining the current system load. Computation service 218 can then allow for user scaling to add more resources, enabling more processing power to process change events 234.

Dispatches 510 occur based on a configuration of microservice actors 238. The configuration is dynamic, allowing for the configurations to be loaded while event processing system 110 is running, which means behavior of event processing system 110 can be altered drastically without having to shut down event processing system 110. If a change occurs to the configuration during execution of event processing system 110, it may update a particular type of microservice actor 238, what change events 234 trigger a particular microservice actor 238, or any other aspect of a microservice actor 238, without stopping execution of event processing system 110.

Figure 6:
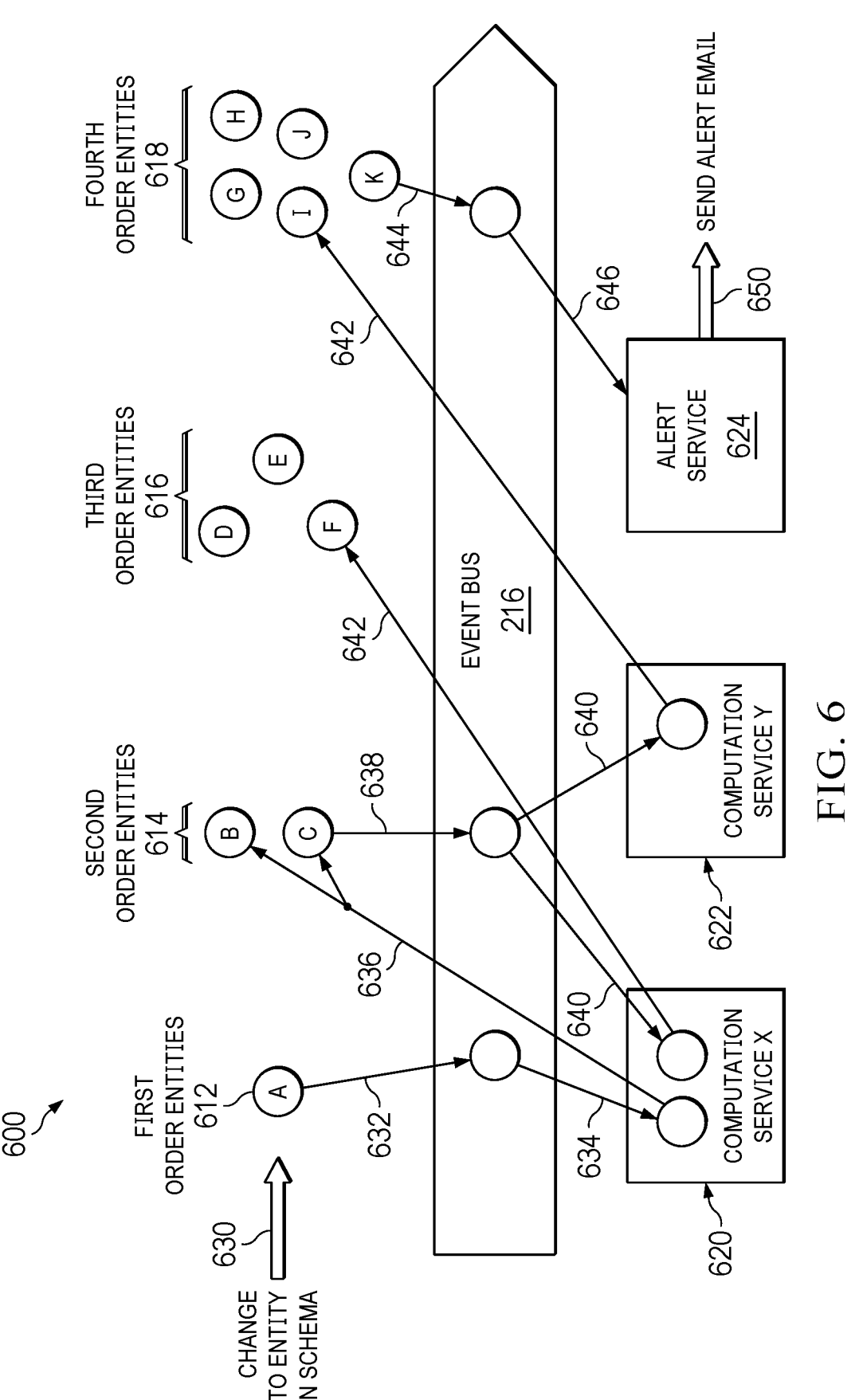
FIG. 6 illustrates an exemplary process for propagating a change through a schema model, according to an embodiment.

FIG. 6 illustrates exemplary process 600 for propagating a change through a schema model. Process 600 involves first order entities 612, second order entities 614, third order entities 616, fourth order entities 618, computation service X 620, computation service Y 622, alert service 624 and event bus 216. Process 600 begins by an update to a data field being made to a first order schema entity 612, entity A, at change to entity in schema 630. Then, at first action 632, a first change event 234 for entity A is generated and sent to event bus 216 for processing. At second action 634, event bus 216 determines microservice actors 238 operating in computation service X 620 that are configured to be trigged by changes to entity A, and thereafter dispatches the first change event 234 to microservice actors 238.

At third action 636, microservice actors 238 of computation service X 620 update data fields for two second order entities 614, entity B and entity C. Then, at fourth action

638, a second change event 234 is generated based on the update to entity C. At fifth action 640, event bus 216 determines that microservice actors 238 in computation service X 620 and microservice actors 238 in computation service Y 622 are both affected by the second change event 234 detected at fourth action 638, and consequently dispatches the second change event 234 to their respective microservice actors 238.

At sixth action 642, two separate updates happen. Firstly, a microservice actor 238 within computation service C 620 updates the data field for three third order entities 616, entity D, entity E and entity F. At the same time, a microservice actor 238 within computation service Y 622 updates fourth order entities 618 entity G, entity H, entity I, entity J and entity K. At seventh action 644, a third change event 234 is generated based on the updates to fourth order entities 618. At eight action 646, event bus 216 dispatches the third change event 234 to a microservice actor 238 in alert service 624, which is capable of sending an alert email to one or more persons responsible for fourth order entities 618 updated at sixth action 642. Thus event processing system 110 automatically propagates changes throughout the schema resulting in an alert being sent to a user of the event processing system 110 at 650.

FIG. 7 illustrates example change event 700, according to an embodiment. In the example of FIG. 7, the schema represented in event processing system 110 is a supply chain, although in practice change events can be modified to represent any other possible schema, such as a business. Change event 700 corresponds to a particular object. As shown, change event 700 includes enterprise indicator 710, "tid," in the event multiple enterprises occupy a single multi-tenancy software. Change event 700 also includes datatype 712, objectId 714 which is unique within the supply chain and identifies the object corresponding to change event 700, change date 716, and list of changes 718 to the object. Here, change event 700 is for a shipment which includes an update to a predicted delivery date, as well as an update to the shipment's latitude and longitude. The object includes one or more data fields which may be indicated to be updated by change event 700. In this example the object includes, as discussed, a predicted delivery date, a latitude and a longitude, although in other examples additional data fields may be included for a shipment object, and many other types of data fields are possible for other types of objects.

FIG. 8 illustrates example configuration 800 of a particular microservice actor 238, according to an embodiment. In the example of FIG. 8, the schema represented in event processing system 110 is a supply chain, although in practice microservice actors 238 can be used in a schema representing any possible complex system, such as a business. Configuration 800 includes processType 810, shipmentType 812, name 814, actorName 816, one or more parameters 818, one or more fields triggeredBy 820 and one or more schedules triggeredBy 822. processType 810 in this example corresponds to a particular type of supply chain planning process, demand, though in other examples microservice actor 238 could instead be associated with a particular business areas. shipmentType 812 in this example is an outboundShipment, although in other examples a particular businessType may instead be specified in configuration 800. Name 814 of configuration 800 is outboundShipmentToDelieveriesFormula and actorName 816 (of an actor corresponding to configuration 800) is formulaActor.

Parameters 818 may be adapted or updated based on a particular business scenario. In this case, parameters 818 include formulaName with a value of shipmentToDeliveriesForumla, noActionDelivery States with a value of Cancelled, stateOperationMapping with a value of Planned Shipment: Save, and updateFields with a value of line.predictedDeliveryDate: predictedDeliveryDate. Parameters 818 may be used by microservice actor 238 to determine whether to dispatch a particular change event 234 to a particular microservice actor 238.

One or more fields triggeredBy 820 indicate under what conditions microservice actor 238 is executed. In this example, microservice actor 238 is executed when its own predictedDeliveryDate data field, corresponding to the shipmentType of outboundShipment, is updated. Microservice actor 238, as shown, may also be triggered regularly according to a particular schedule, in this case running on Monday of every week, as indicated by one or more schedules triggeredBy 822.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for propagating changes to a schema model, comprising:

a computer, comprising a processor and memory, and configured to propagate changes to the schema model by:

detecting a change to a system represented by the schema model;

generating a change event based on the change to the schema model;

determining one or more microservice actors that execute within a container-based computation service and are associated with content of the change event, wherein the one or more microservice actors is configured to be triggered by the change event;

dispatching the change event over an event bus to the one or more microservice actors, wherein the event bus comprises a scalable distributed event processing bus;

updating, by the one or more microservice actors, the schema model at runtime;

update a configuration of microservice actors while executing computation service;

tracking a total number of active change events and, in response to the tracking, scale up or down a number of microservice actors;

dispatching at least one further change event by the one or more microservice actors using at least one directed acyclic graph to prevent the at least one further change event from being infinitely called; and displaying a graphical user interface (GUI) that displays one or more interactive visualizations of the schema model, wherein the one or more interactive visualizations comprise graphical elements for updating data fields of schema entities.

2. The system of claim 1, wherein the computer is further configured to:

detect a second change to the system represented by the schema model based on the one or more microservice actors updating the schema model; and generate a second change event based on the second change.

3. The system of claim 1, wherein the change event further comprises:

identifying an object of a particular schema model that has been updated, data that has been updated, data that has been replaced or a time that an update occurred.

4. The system of claim 1, wherein behavior of each of the one or more microservice actors is specified by a configuration file, wherein the configuration file is associated with a particular microservice actor and specifies one or more of the following:

the name of a particular microservice actor, what objects a microservice actor can update, actions a microservice actor can take and change events that trigger a microservice actor.

5. The system of claim 1, wherein the computer is further configured to set up and control one or more virtual machines to execute the one or more microservice actors.

6. A computer-implemented method for propagating changes to a schema model, comprising:

detecting, by a computer comprising a memory and a processor, a change to a system represented by the schema model;

generating, by the computer, a change event based on the change to the schema model;

determining, by the computer, one or more microservice actors that execute within a container-based computation service and are associated with content of the change event, wherein the one or more microservice actors is configured to be triggered by the change event;

dispatching, by the computer, the change event over an event bus to the one or more microservice actors, wherein the event bus comprises a scalable distributed event processing bus;

updating, by the computer, by the one or more microservice actors, the schema model at runtime;

updating, by the computer, a configuration of microservice actors while executing computation service;

tracking, by the computer a total number of active change events and, in response to the tracking, scale up or down a number of microservice actors;

dispatching, by the computer, at least one further change event by the one or more microservice actors using at least one directed acyclic graph to prevent the at least one further change event from being infinitely called; and displaying, by the computer, a graphical user interface (GUI) that displays one or more interactive visualizations of the schema model, wherein the one or more interactive visualizations comprise graphical elements for updating data fields of schema entities.

7. The method of claim 6, further comprising:

detecting, by the computer, a second change to the system represented by the schema model based on the one or more microservice actors updating the schema model; and generating, by the computer, a second change event based on the second change.

8. The method of claim 6, wherein the change event further comprises identifying an object of a particular schema model that has been updated, data that has been updated, data that has been replaced or a time that an update occurred.

9. The method of claim 6, wherein behavior of each of the one or more microservice actors is specified by a configuration file, wherein the configuration file is associated with a particular microservice actor and specifies one or more of the following:

the name of a particular microservice actor, what objects a microservice actor can update, actions a microservice actor can take and change events that trigger a microservice actor.

10. The method of claim 6, further comprising:

setting up and controlling, by the computer, one or more virtual machines to execute the one or more microservice actors.

11. A non-transitory computer-readable medium embodied with software for propagating changes to a schema model, the software when executed configured to:

detect a change to a system represented by the schema model;

generate a change event based on the change to the schema model;

determine one or more microservice actors that execute within a container-based computation service and are associated with content of the change event, wherein the one or more microservice actors is configured to be triggered by the change event;

dispatch the change event over an event bus to the one or more microservice actors, wherein the event bus comprises a scalable distributed event processing bus;

update, by the one or more microservice actors, the schema model at runtime;

updating a configuration of microservice actors while executing computation service;

tracking a total number of active change events and, in response to the tracking, scale up or down a number of microservice actors;

dispatch at least one further change event by the one or more microservice actors using at least one directed acyclic graph to prevent the at least one further change event from being infinitely called; and display a graphical user interface (GUI) that displays one or more interactive visualizations of the schema model, wherein the one or more interactive visualizations comprise graphical elements for updating data fields of schema entities.

12. The non-transitory computer-readable medium of claim 11, wherein the software when executed is further configured to:

detect a second change to the system represented by the schema model based on the one or more microservice actors updating the schema model; and generate a second change event based on the second change.

13. The non-transitory computer-readable medium of claim 11, wherein the change event further comprises identifying an object of a particular schema model that has been updated, data that has been updated, data that has been replaced or a time that an update occurred.

14. The non-transitory computer-readable medium of claim 11, wherein behavior of each of the one or more microservice actors is specified by a configuration file, wherein the configuration file is associated with a particular microservice actor and specifies one or more of the following:

the name of a particular microservice actor, what objects a microservice actor can update, actions a microservice actor can take and change events that trigger a microservice actor.

* * * * *